United States Patent
Vaughn et al.

(10) Patent No.: US 11,397,858 B2
(45) Date of Patent: Jul. 26, 2022

(54) UTILIZING WIDGET CONTENT BY VIRTUAL AGENT TO INITIATE CONVERSATION

(71) Applicant: Kyndryl, Inc., New York, NY (US)

(72) Inventors: Garfield W. Vaughn, South Windsor, CT (US); Vasanthi M. Gopal, Plainsboro, NJ (US); Gandhi Sivakumar, Bentleigh (AU); Malar Kandasamy, Bangalore (IN); Lakshmi Priya Shanmugam, Bangalore (IN)

(73) Assignee: KYNDRYL, INC., New York, NY (US)

( * ) Notice: Subject to any disclaimer, the term of this patent is extended or adjusted under 35 U.S.C. 154(b) by 161 days.

(21) Appl. No.: 16/541,601

(22) Filed: Aug. 15, 2019

(65) Prior Publication Data
US 2021/0049238 A1    Feb. 18, 2021

(51) Int. Cl.
*G06F 40/30*     (2020.01)
*G06F 3/0481*    (2022.01)
(Continued)

(52) U.S. Cl.
CPC ............ *G06F 40/30* (2020.01); *G06F 3/013* (2013.01); *G06F 3/0481* (2013.01); *G06N 20/00* (2019.01)

(58) Field of Classification Search
CPC .... G06F 17/2785; G06F 3/0481; G06F 3/013; G06N 20/00
See application file for complete search history.

(56) References Cited

U.S. PATENT DOCUMENTS

| 6,233,570 | B1 * | 5/2001 | Horvitz | G06N 5/00 |
| | | | | 706/11 |
| 8,266,274 | B2 * | 9/2012 | Allen | G06F 16/48 |
| | | | | 709/224 |

(Continued)

FOREIGN PATENT DOCUMENTS

WO    2002073331 A2    9/2002

OTHER PUBLICATIONS

Mar Masson Maack, "Meet Nadia, the Scarily 'Human' Chatbot who can Read Your Emotions," https://thenextweb.com/artificial-intelligence/2017/03/24/say-hello-to-nadia-the-terrifyingly-human-chatbot-with-emotional-intelligence, Mar. 24, 2017, pp. 1-5.

*Primary Examiner* — William L Bashore
*Assistant Examiner* — Gregory A Distefano
(74) *Attorney, Agent, or Firm* — Ken Han; Andrew M. Calderon; Roberts Calderon Safran & Cole, P.C.

(57) ABSTRACT

A computer-implemented method, system and computer program product for initiating a conversation by a virtual agent. The boundary of a widget of a webpage the user is utilizing is determined. The user's interactions or lack of interactions with the widget within the determined boundary of the widget of the webpage is then determined, such as based on tracking the eye gaze or focus of the user. If it is determined that the user is experiencing difficulty in utilizing the widget, then the content associated with the widget is extracted. The extracted widget content is then mapped to the virtual agent content. The virtual agent is instructed to initiate a conversation based on the extracted widget content. In this manner, the virtual agent will now be able to dynamically initiate a conversation with the user to assist the user in addressing a problem the user is currently experiencing with the widget.

14 Claims, 6 Drawing Sheets

(51) Int. Cl.
*G06F 3/01* (2006.01)
*G06N 20/00* (2019.01)

(56) References Cited

U.S. PATENT DOCUMENTS

| | | | |
|---|---|---|---|
| 8,350,844 B2* | 1/2013 | Sharp | A63F 13/61 |
| | | | 345/419 |
| 8,850,315 B1* | 9/2014 | Rogers | G06F 9/453 |
| | | | 715/707 |
| 8,903,716 B2 | 12/2014 | Chen et al. | |
| 9,752,889 B2 | 9/2017 | Ren et al. | |
| 9,842,093 B2 | 12/2017 | Powell et al. | |
| 10,198,408 B1* | 2/2019 | Commisso | G06F 40/143 |
| 10,686,738 B2* | 6/2020 | Daniel | H04L 51/046 |
| 2003/0229648 A1 | 12/2003 | Tang et al. | |
| 2006/0256133 A1 | 11/2006 | Rosenberg | |
| 2010/0269039 A1* | 10/2010 | Pahlavan | G06F 9/452 |
| | | | 715/702 |
| 2013/0054622 A1* | 2/2013 | Karmarkar | G06F 16/436 |
| | | | 707/749 |
| 2013/0244743 A1 | 9/2013 | Barclay et al. | |
| 2015/0042552 A1* | 2/2015 | Tsoref | G06F 3/0304 |
| | | | 345/156 |
| 2015/0262069 A1 | 9/2015 | Gabriel et al. | |
| 2019/0051305 A1 | 2/2019 | Liddell et al. | |
| 2021/0349531 A1* | 11/2021 | Hajimirza | G06F 3/04842 |

\* cited by examiner

UTILIZING WIDGET CONTENT BY VIRTUAL AGENT TO INITIATE CONVERSATION

TECHNICAL FIELD

The present invention relates generally to virtual agents, and more particularly to utilizing widget content by virtual agents to initiate conversations.

BACKGROUND

A virtual agent used in dialogue systems is a computer generated, animated, artificial intelligent virtual character (usually with anthropomorphic appearance) that may serve as an online customer service representative. It leads an intelligent conversation with users, responds to their questions and performs adequate non-verbal behavior. For example, a virtual agent may provide advice, guidance and assistance to help users find information and answer their questions.

In addition to appearing as a graphical object on a computer display, a virtual agent may appear as holographic projections, such as welcoming customers in a hotel lobby, restaurant or business office reception.

Currently, virtual agents initiate a conversation with a user based on a pre-programmed set of questions or statements to ask users in response to a trigger event, such as based on user activity (e.g., user selects the option requesting help with a printer issue). That is, virtual agents initiate a conversation based on a static set of questions or statements in response to a trigger event.

SUMMARY

In one embodiment of the present invention, a computer-implemented method for initiating a conversation by a virtual agent comprises determining a boundary of a widget of a webpage. The method further comprises detecting user's interactions or lack of interactions with the widget within the determined boundary of the widget of the webpage. The method additionally comprises extracting content associated with the widget in response to a user experiencing difficulty in utilizing the widget of the webpage. Furthermore, the method comprises mapping the extracted content to a virtual agent content. Additionally, the method comprises instructing the virtual agent to initiate a conversation based on the extracted content.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a computer-implemented method, system and computer program product for initiating a conversation by a virtual agent. In one embodiment of the present invention, the boundary of a widget of a webpage utilized by the user is determined. The user's interactions or lack of interactions with the widget within the determined boundary of the widget of the webpage is determined, such as based on tracking the eye gaze or focus of the user. If it is determined that the user is experiencing difficulty in utilizing the widget, then the content associated with the widget is extracted. In one embodiment, such a determination is made based on evaluating the captured facial images of the user to determine emotions, facial expressions, etc. which are used to determine whether the user is experiencing difficulty in utilizing a widget of the webpage. The extracted widget content is then mapped to the virtual agent content. The virtual agent is then instructed to initiate a conversation based on the extracted widget content. In this manner, the virtual agent will now be able to dynamically initiate a conversation with the user to assist the user in addressing a problem the user is currently experiencing with the widget.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
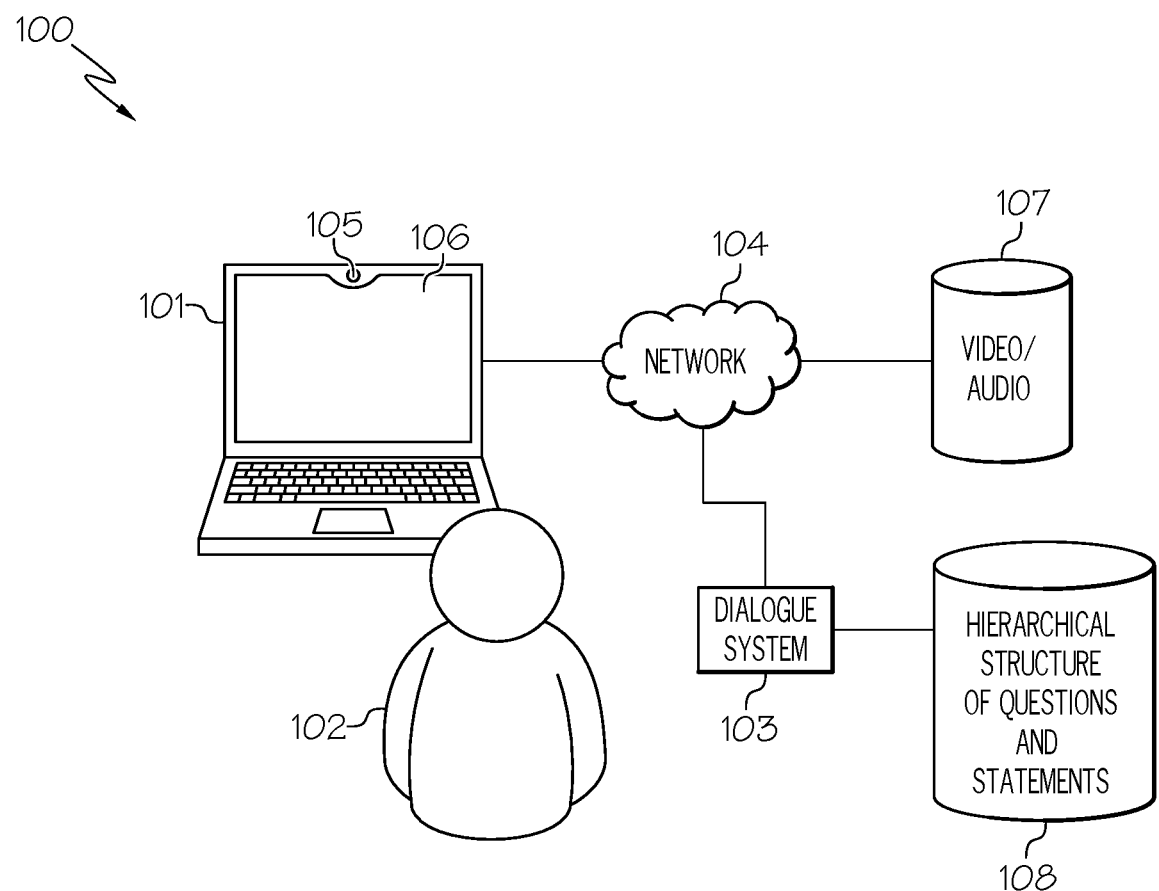
FIG. 1 illustrates a communication system for practicing the principles of the present invention in accordance with an embodiment of the present invention.

Referring now to the Figures in detail, FIG. 1 illustrates a communication system 100 configured in accordance with an embodiment of the present invention. System 100 includes a computing device 101 operated by a user 102. As illustrated in FIG. 1, computing device 101 is connected to a dialogue system 103 via a network 104. Computing device 101 may be any type of computing device (e.g., a portable computing unit, a Personal Digital Assistant (PDA), a mobile device, a tablet personal computer, a smartphone, a laptop computer, a mobile phone, a cellular phone, a navigation device, a gaming unit, a desktop computer system, a workstation, an Internet appliance and the like) configured with the capability of communicating with dialogue system 103 via network 104.

In one embodiment, computing device 101 is able to detect the user's interactions (including the initial interaction) or lack of interactions with a widget of a webpage by tracking the eye gaze or focus of user 102 as discussed further below. A "widget," as used herein, refers to a stand-alone application that can be embedded within a webpage, such as a control element in a graphical user interface which is an element of interaction. Examples of widgets include, but not limited to, a portlet, a music player, a calendar, HTML/code snippets (these are widgets in which the user adds their own code so that the user can display images, add links to those images, embed values, etc.), mailing list, a Twitter® widget (e.g., widget displays 3-5 of the user's most recent tweets and also provides a link to the user's Twitter® profile so that others can follow the user), etc. A description of an embodiment of a hardware configuration of computing device 101 is provided below in connection with FIG. 2.

In one embodiment, computing device 101 utilizes an eye tracker 105 to track the eye gaze or focus of user 102 to determine if user 102 is interacting (including the initial interaction) or not interacting with a widget of the webpage. In one embodiment, eye tracker 105 is positioned on computing device 101 as shown in FIG. 1. Alternatively, eye tracker 105 may be head-mounted on user 102. In such an embodiment, the head-mounted eye tracker is connected to computing device 101 via network 104.

In one embodiment, eye tracker 105 includes a light source and a camera. In one embodiment, the light source (usually infrared) is directed toward the eye. The camera tracks the reflection of the light source along with visible ocular features, such as the pupil. This data is used to extrapolate the rotation of the eye and ultimately the direction of gaze. Additional information, such as blink frequency and changes in pupil diameter, are also detected by eye tracker 105. The aggregated data is written to a file that is compatible with eye-tracking analysis software, such as EyeWorks™.

In one embodiment, eye tracker 105 corresponds to a web camera to track the eye gaze of user 102. In such an embodiment, the web camera detects the location of the face of user 102 followed by detecting the location of the eyes within the face of user 102 followed by detecting the orientation of the left and right eye and then mapping the orientation of the eyes onto the screen coordinate system. In one embodiment, calibration is relied upon to perform the mapping. In one embodiment, the calibration is performed by exposing a number of calibration points on the screen (e.g., display 106) and then asking user 102 to look at those points in order to build a model.

In one embodiment, eye tracker 105 (e.g., Tobii® IS4 Platform) consists of sensors (e.g., camera and projectors) and utilizes algorithms (e.g., application 204) executed by the processor of computing device 101. In one embodiment, eye tracker 105 includes micro projectors which are used to create a reflection pattern of near-infrared light on the eyes. Furthermore, eye tracker 105 includes sensors to capture high frame-rate images of the user's eyes and reflection patterns. The algorithms (image-processing algorithms) executed by the processor of computing device 101 identifies the specific details in the user's eyes and reflection patterns and interprets the image stream generated by the sensors. The algorithms calculate the user's eyes and gaze point.

In one embodiment, eye tracker 105 uses models of the eye of user 102 to determine where the pupil of user 102 is located. That is, eye tracker 105 uses models of the eye to determine where the pupil of user 102 is located. Eye tracker 105 then estimates the gaze of user 102 using the eye position of user 102 and image processing techniques to determine where the user is looking. As discussed above, gaze may be determined by shining light (e.g., infrared light) into the eye of user 102. This creates a glint in the eye that is consistently located at the same point on the surface of the eye. Thus, the gaze of the user can be calculated using the distance between the pupil and the glint.

In one embodiment, eye tracker 105 corresponds to a web camera that is utilized to detect eye shrinks, facial expressions and emotions. In one embodiment, emotions determination (recognition process) is performed in 3 basic phases: face detection, facial features extraction, and expression classification utilizing Affectiva® Software Development Kits (SDKs). In one embodiment, the web camera captures images of various facial expressions of user 102, where facial landmarks on these images can be automatically detected using the SDK from Affectiva®. In one embodiment, the geometric feature based approach is used for feature extraction. The distance between landmarks is used as a feature, and for selecting an optimal set of features, the brute force method is used. In one embodiment, a neural network algorithm is used for classification. In one embodiment, computing device 101 recognizes 7 facial expressions, namely anger, disgust, fear, happiness, sadness, surprise and neutral.

In one embodiment, such detected eye shrinks, facial expressions and emotions are used to determine whether user 102 is experiencing difficulty in utilizing a widget of the webpage. For example, if user 102 is expressing anger or disgust when user 102 is utilizing a widget, then it may be inferred that user 102 is experiencing difficulty in utilizing the widget. For instance, if user 102 expresses anger or disgust a threshold number of times over a threshold period of time, then it may be inferred that user 102 is experiencing difficulty in utilizing the widget. In another example, if the user's period of inactivity exceeds a threshold period of time and the user's gaze at the widget exceeds a threshold period of time, then it may be inferred that user 102 is experiencing difficulty in utilizing the widget.

In another embodiment, eye tracker 105 corresponds to a web camera that is utilized to capture facial images of user 102 to determine whether user 102 is experiencing difficulty in utilizing a widget of the webpage. Computing device 101 utilizes facial expression from Selas (Esentepe M. Elçi S. No: 11/9 Kartal, Istanbul, Turkey) to measure and categorize emotions from these captured facial images, such as happiness, surprise, sadness, anger, fear, disgust and neutral. Also, expression intensity may be identified.

Other tools may be utilized by computing device 101 to evaluate the captured facial images of user 102 to determine emotions, facial expressions, etc. which are used to determine whether user 102 is experiencing difficulty in utilizing a widget of the webpage. For example, Facelytics by Wassa and the platform by EyeSee may be utilized to determine emotions, facial expressions, etc. based on the captured facial images of user 102.

As discussed above, system 100 includes a dialogue system 103. A dialogue system 103 is a computer system intended to converse with a human with a coherent structure.

In one embodiment, dialogue system 103 employs text, speech, graphics, gestures, and other modes for communication on both the input and output channel. In one embodiment, dialogue system 103 employs a "virtual agent." A "virtual agent," as used herein, refers to a computer generated, animated, artificial intelligent virtual character (usually with anthropomorphic appearance) that may serve as an online customer service representative. It leads an intelligent conversation with users, responds to their questions and performs adequate non-verbal behavior. For example, a virtual agent may provide advice, guidance and assistance to help users find information and answer their questions. A description of an embodiment of a hardware configuration of dialogue system 103 is provided below in connection with FIG. 3.

In one embodiment, computing device 101 extracts content associated with a widget of a webpage when user 102 is experiencing difficulty with using such a widget. After extracting the content associated with the widget when user 102 is experiencing difficulty with using such a widget, computing device 101 maps the extracted content to the virtual agent content and then dialogue system 103 initiates a conversation with user 102 by the virtual agent based on the extracted content associated with the widget. By mapping the extracted content to the virtual agent content, the virtual agent will now be able to provide advice, guidance and assistance to user 102 in utilizing the widget as discussed in further detail below.

In one embodiment, the virtual agent of dialogue system 103 may be able to play audio or video snippets to assist user 102 in utilizing the widget. For example, the virtual agent of dialogue system 103 may access such audio or video snippets stored in a database 107 connected to dialogue system 103 via network 104. Such audio or video snippets may be previously stored and categorized in database 107 based on its content. For instance, a video regarding providing assistance with drawing flowcharts in Microsoft® Word may be categorized as assistance with drawing flowcharts in Microsoft® Word. If user 102 is experiencing difficulty in utilizing a widget involving drawing flowcharts in Microsoft® Word, then the content extracted associated with such a widget may indicate drawing flowcharts in Microsoft® Word. In one embodiment, the virtual agent identifies the meaning of such content (e.g., drawing flowcharts in Microsoft® Word) via natural language processing. After mapping such extracted content to the virtual agent content, the virtual agent may then obtain a video regarding drawing flowcharts in Microsoft® Word based on its classification from database 107 to be provided to user 102 to assist user 102 in utilizing the widget.

Similarly, audio files may be stored and categorized in database 107 which allows the virtual agent to obtain relevant audio files to be provided to user 102 to assist user 102 in utilizing the widget.

In one embodiment, dialogue system 103 obtains the appropriate audio and/or video files from database 107 with a classification that matches within a threshold degree of relevance (can be user-selected) to the meaning of the extracted content. "Threshold degree of relevance," as used herein, refers to the degree that the meaning of the extracted content is semantically similar in meaning to the classification of the stored audio and/or video files in database 107. "Semantic meaning," as used herein, refers to knowing what the collection of words (e.g., words, phrases) in the extracted content or classification actually means. For instance, it can be inferred that the meaning of the content involving the terms "ball" and "bat" refers to a baseball bat as opposed to being directed to a bat that is a mammal due to the fact that the word "ball" is used in close proximity to the term "bat."

In an alternative embodiment, computing device 101 may determine the meaning of the extracted content (e.g., drawing flowcharts in Microsoft® Word) via natural language processing. Computing device 101 may then obtain the appropriate audio and/or video files from database 107 with a classification that matches within a threshold degree of relevance (can be user-selected) to the meaning of the extracted content. In one embodiment, such a determination is made via natural language processing.

Furthermore, dialogue system 103 may be connected to a database 108, which stores a hierarchical structure of a dialog, including questions and statements involving various topics, where each question or statement is categorized based on a topic. Based on determining the meaning of the extracted widget content using natural language processing, dialogue system 103 is able to identify the appropriate question or statement to initiate the conversation with user 102 by the virtual agent. For example, if the determined meaning of the extracted widget was weather information for the city of Austin, Tex., then dialogue system 103 may identify a question stored in database 108 related to the topic of weather forecast, such as the question of "Would you like to know how to obtain the future weather forecast," to be presented to user 102 by the virtual agent.

As also discussed above, computing device 101 is connected to dialogue system 103 via network 104. Network 104 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 is not to be limited in scope to any one particular network architecture. System 100 may include any number of computing devices 101, users 102, dialogue systems 103, networks 104 and databases 107, 108. Furthermore, while FIG. 1 illustrates dialogue system 103 and computing device 101 as being separate physical devices, some or all of the functionality of dialogue system 103 may reside in computing device 101. Conversely, some or all of the functionality of computing device 101 may reside in dialogue system 103.

Figure 2:
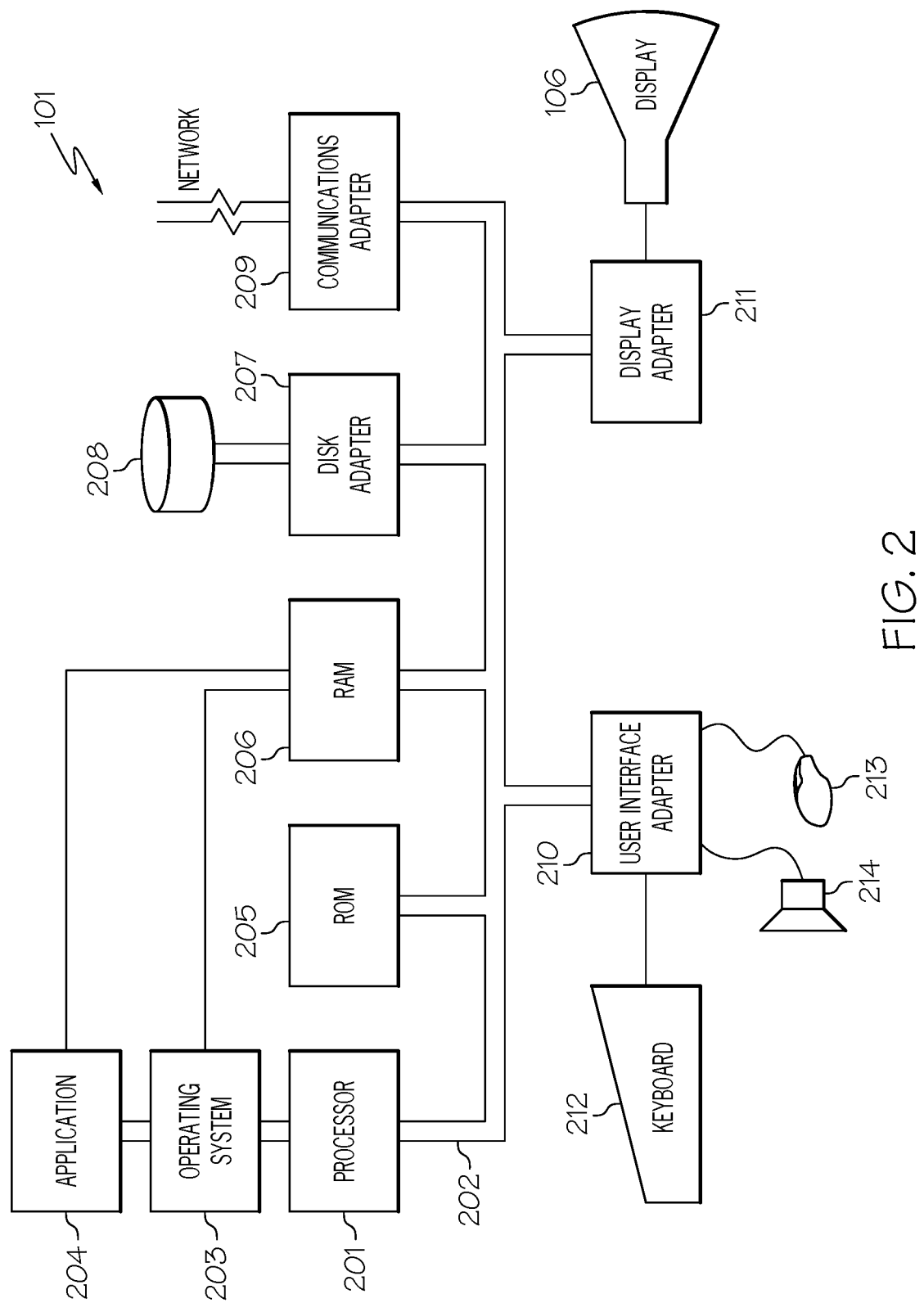
FIG. 2 illustrates an embodiment of the present invention of a hardware configuration of a computing device which is representative of a hardware environment for practicing the present invention.

Referring now to FIG. 2, FIG. 2 illustrates an embodiment of the present invention of the hardware configuration of computing device 101 (FIG. 1) which is representative of a hardware environment for practicing the present invention. Referring to FIG. 2, computing device 101 may have a processor 201 connected to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a web browser, eye-tracking analysis software or a program for extracting relevant widget content when a user is experiencing difficulty in utilizing the widget, which is to be mapped to the virtual agent content, as discussed further below in connection with FIGS. 4-6.

Referring again to FIG. 2, read-only memory ("ROM") 205 may be connected to system bus 202 and include a basic input/output system ("BIOS") that controls certain basic functions of computing device 101. Random access memory ("RAM") 206 and disk adapter 207 may also be connected to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for extracting relevant widget content when a user is experiencing difficulty in utilizing the widget, which is to be mapped to the virtual agent content, as discussed further below in connection with FIGS. 4-6, may reside in disk unit 208 or in application 204.

Computing device 101 may further include a communications adapter 209 connected to bus 202. Communications adapter 209 may interconnect bus 202 with an outside network (e.g., network 104 of FIG. 1) thereby allowing computing device 101 to communicate with other devices, such as dialogue system 103 of FIG. 1.

I/O devices may also be connected to computing device 101 via a user interface adapter 210 and a display adapter 211. Keyboard 212, mouse 213 and speaker 214 may all be interconnected to bus 202 through user interface adapter 210. A display monitor 106 may be connected to system bus 202 by display adapter 211. In this manner, a user is capable of inputting to computing device 101 through keyboard 212 or mouse 213 and receiving output from computing device 101 via display 106 or speaker 214. Other input mechanisms may be used to input data to computing device 101 that are not shown in FIG. 2, such as display 106 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

Figure 3:
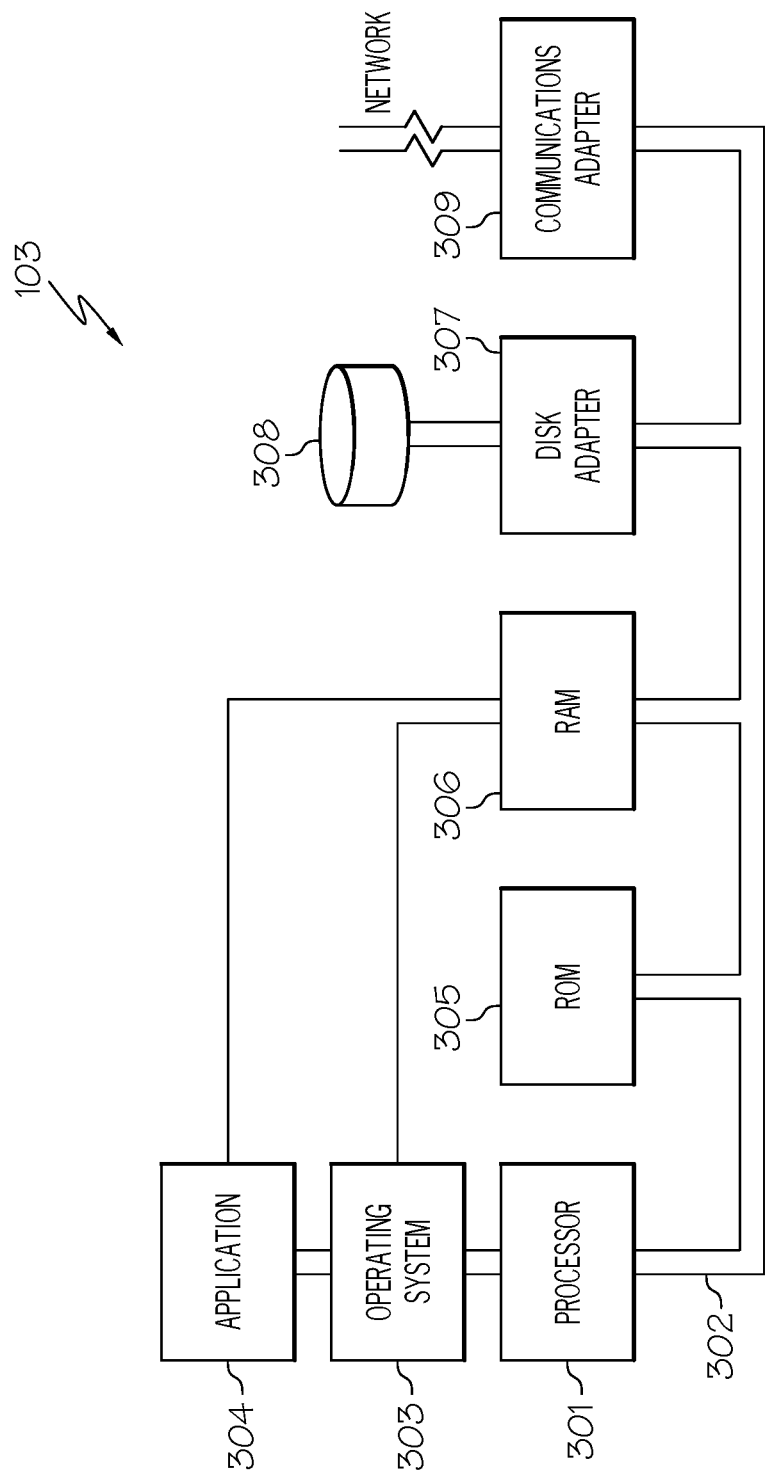
FIG. 3 illustrates a hardware configuration of a dialogue system which is representative of a hardware environment for practicing the present invention.

Referring now to FIG. 3, FIG. 3 illustrates a hardware configuration of dialogue system 103 (FIG. 1) which is representative of a hardware environment for practicing the present invention. Referring to FIG. 3, dialogue system 103 has a processor 301 connected to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for initiating a conversation by the virtual agent based on the extracted content associated with the widget the user is experiencing difficulty in utilizing as discussed below in association with FIGS. 4-6.

Referring again to FIG. 3, read-only memory ("ROM") 305 is connected to system bus 302 and includes a basic input/output system ("BIOS") that controls certain basic functions of dialogue system 103. Random access memory ("RAM") 306 and disk adapter 307 are also connected to system bus 302. It should be noted that software components including operating system 303 and application 304 may be loaded into RAM 306, which may be dialogue system's 103 main memory for execution. Disk adapter 307 may be an integrated drive electronics ("IDE") adapter that communicates with a disk unit 308, e.g., disk drive. It is noted that the program for initiating a conversation by the virtual agent based on the extracted content associated with the widget the user is experiencing difficulty in utilizing, as discussed below in association with FIGS. 4-6, may reside in disk unit 308 or in application 304.

Dialogue system 103 may further include a communications adapter 309 connected to bus 302. Communications adapter 309 interconnects bus 302 with an outside network (e.g., network 104 of FIG. 1) thereby allowing dialogue system 103 to communicate with computing device 101.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, virtual agents used in dialogue systems initiate a conversation with a user based on a pre-programmed set of questions or statements to ask users in response to a trigger event, such as based on user activity (e.g., user selects the option requesting help with a printer issue). That is, virtual agents initiate a conversation based on a static set of questions or statements in response to a trigger event. However, the virtual agent will not be able to provide advice, guidance and assistance to the user if there is not a trigger event. Furthermore, the lead question in the conversation begun by the virtual agent may not be helpful for the user. For example, if the user is currently experiencing difficulty in utilizing a widget of a webpage, and there is no trigger event associated with such difficulty, then the virtual agent will not be able to provide advice, guidance and assistance to the user in utilizing the widget. Furthermore, because the virtual agent uses a static set of questions or statements, the lead question may not be useful in assisting the user, such as assisting the user in utilizing the widget.

Figure 4:
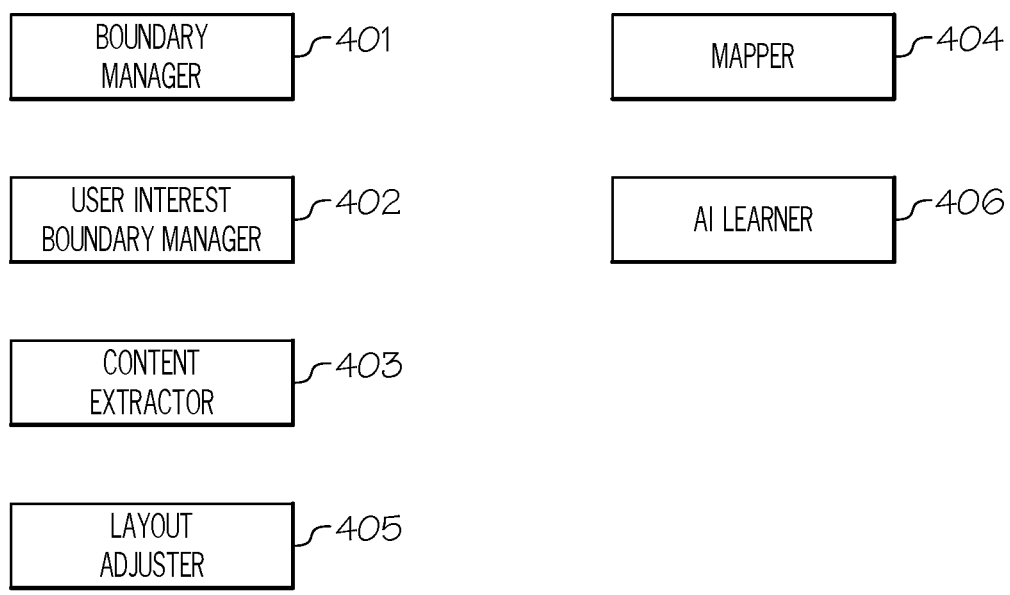
FIG. 4 illustrates the software components used in extracting relevant widget content when a user is experiencing difficulty in utilizing the widget in accordance with an embodiment of the present invention.
Figure 5:
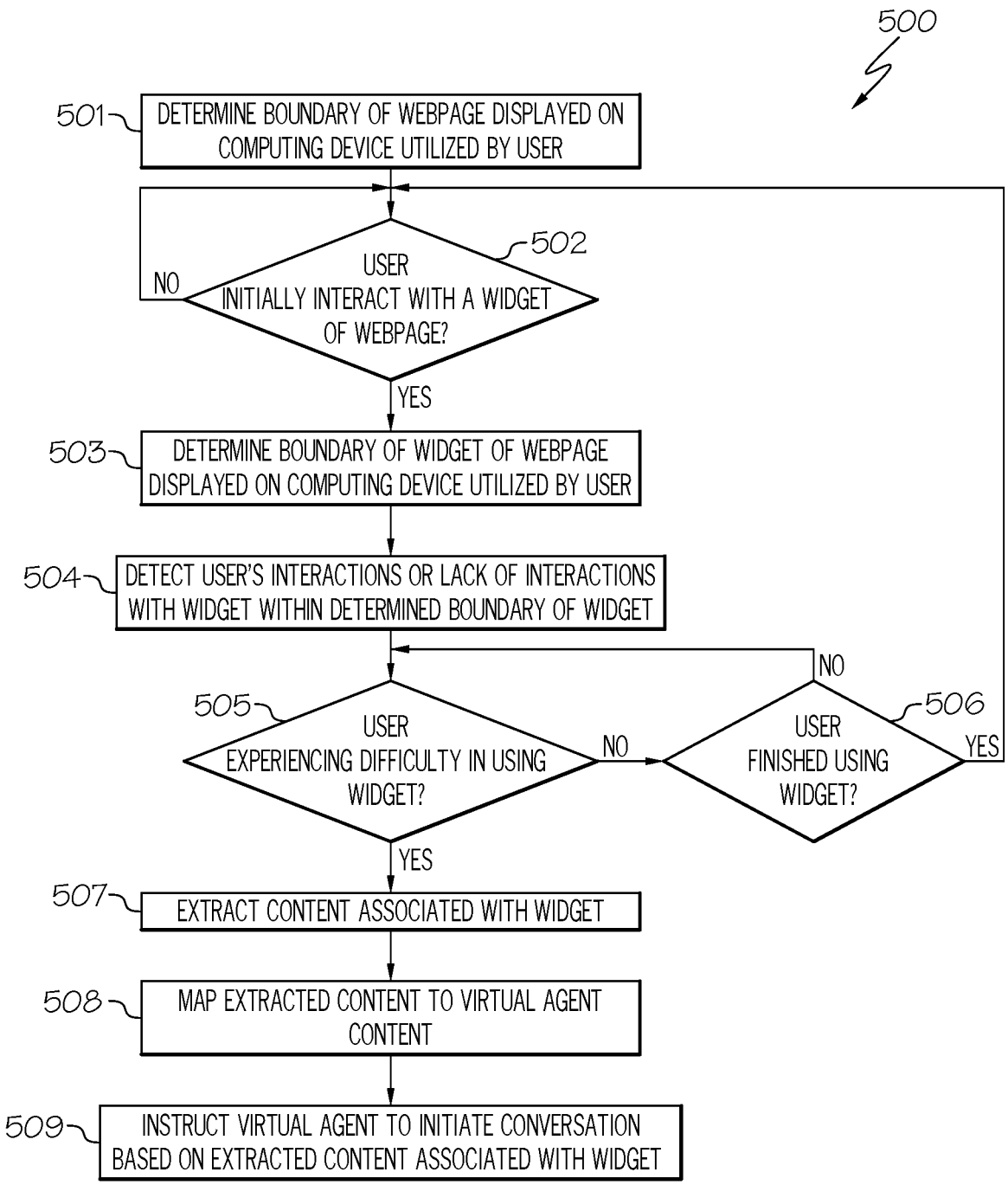
FIG. 5 is a flowchart of a method for initiating a conversation by the virtual agent with the user to provide advice, guidance and assistance to the user in utilizing a widget the user is having difficulty using in accordance with an embodiment of the present invention.
Figure 6:
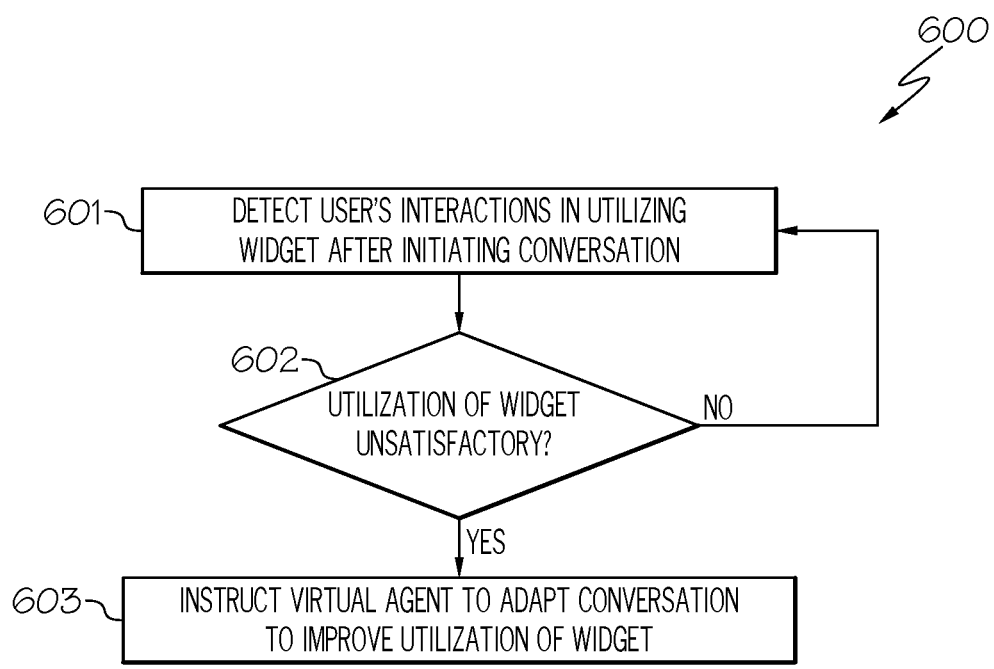
FIG. 6 is a flowchart of a method for adapting the conversation based on the user's utilization of the widget after initialization of the conversation by the virtual agent in accordance with an embodiment of the present invention.

The embodiments of the present invention provide a means for enabling the virtual agent to obtain the content from a widget which the user is experiencing difficulty in using which allows the virtual agent to initiate a conversation with the user to provide advice, guidance and assistance to the user in utilizing the widget as discussed below in connection with FIGS. 4-6. FIG. 4 illustrates the software components used in extracting relevant widget content when a user is experiencing difficulty in utilizing the widget. FIG. 5 is a flowchart of a method for initiating a conversation by the virtual agent with the user to provide advice, guidance and assistance to the user in utilizing a widget the user is having difficulty using. FIG. 6 is a flowchart of a method for adapting the conversation based on the user's utilization of the widget after initialization of the conversation by the virtual agent.

As stated above, FIG. 4 illustrates the software components used in extracting relevant widget content when a user is experiencing difficulty in utilizing the widget in accordance with an embodiment of the present invention. In one embodiment, such components reside within application 204 of computing device 101.

Referring to FIG. 4, in conjunction with FIGS. 1 and 2, the software components include a boundary manager 401 configured to determine the boundary of the webpage displayed on display 106 of the user's computing device 101. In one embodiment, such a boundary is determined from the screen resolution of computing device 101, the selected font size, the selected font style, etc.

The software components further include a user interest boundary manager 402 configured to determine the boundary of the widget of interest on the webpage. The "widget of interest," as used herein, refers to a widget being utilized by user 102. In one embodiment, the widget of interest is determined based on tracking the eye gaze or focus of user 102. For example, in one embodiment, the eye tracker 105 corresponds to a web camera to track the eye gaze of user 102. In such an embodiment, the web camera detects the location of the face of user 102 followed by detecting the location of the eyes within the face of user 102 followed by detecting the orientation of the left and right eye and then mapping the orientation of the eyes onto the screen coordinate system. By mapping the orientation of the eyes onto the screen coordinate system, user interest boundary manager 402 is able to determine the focus of user 102 on display 106 of computing device 101, including a widget displayed on display 106 of computing device 101. In one embodiment, user interest boundary manager 402 obtains the locations of the widgets on the webpage displayed on display 106 of computing device via the HTML code of the webpage translated by the web browser of computing device 101. User interest boundary manager 402 may then determine if user 102 is interacting with one of these displayed widgets based on the area of display 106 being focused by user 102.

In one embodiment, user interest boundary manager 402 further determines the boundary of the widget of interest in the webpage displayed on computing device 101 based on the determined boundary of the webpage. For example, the boundary of the widget of interest may be based on the defined layout size of the displayed webpage.

In one embodiment, the boundary of the widget of interest may be determined by user interest boundary manager 402 analyzing the HTML code of the webpage listing the border attributes of the widget of the interest.

The software components further include a content extractor 403 configured to extract the content that is associated with the widget that the user is experiencing difficulty in using.

Furthermore, the software components include a mapper 404 configured to map the extracted content to the virtual agent content so that the virtual agent will ask more relevant questions.

Additionally, the software components include a layout adjuster 405 configured to adjust the layout after user 102 has been identified as experiencing difficulty in using the widget. For example, the font size in the depicted virtual agent on display 106 may be increased to attract the attention of user 102 when the dynamic content is starting to be presented as discussed below.

Additionally, the software components include an artificial intelligence (AI) learner 406 that determines the meaning of the extracted content (e.g., drawing flowcharts in Microsoft® Word) via natural language processing. AI learner 406 may then obtain the appropriate audio and/or video files from database 107 with a classification that matches within a threshold degree of relevance (can be user-selected) to the meaning of the extracted content. In one embodiment, such a determination is made via natural language processing.

In one embodiment, AI learner 406 determines the progression or success in user 102 utilizing the widget after the virtual agent initiates a conversation with user 102 to provide advice, guidance and assistance to user 102 in utilizing the widget. In one embodiment, such an analysis involves eye tracker 105 determining if user 102 is interacting or not interacting with the widget after the conversation was initiated by the virtual agent. Furthermore, in one embodiment, such an analysis involves whether user 102 has responded to an instruction provided by the virtual agent, such as by clicking on the link to a video snippet provided by the virtual agent. If the user's utilization of the widget after the conversation is initiated by the virtual agent is unsatisfactory, then AI learner 406 may inform the virtual agent to adapt the conversation to improve utilization of the widget. For example, the virtual agent may present the procedure to reset the user's smartphone. However, if user 102 is still demonstrating difficulty in using the widget based on the input provided by AI learner 406, such as by user 102 not interacting with the widget or clicking on the link to the procedure, then the virtual agent may adapt the message to inquire as to what issue user 102 is having with the user's smartphone.

Additional details regarding the functionality of the software components of FIG. 4 is provided below in connection with FIGS. 5 and 6

Turning now to FIG. 5, FIG. 5 is a flowchart of a method 500 for initiating a conversation by the virtual agent with the user to provide advice, guidance and assistance to the user in utilizing a widget the user is having difficulty using in accordance with an embodiment of the present invention.

Referring to FIG. 5, in conjunction with FIGS. 1-4, in step 501, boundary manager 401 determines the boundary of the webpage displayed on computing device 101 utilized by user. As discussed above, in one embodiment, such a boundary is determined from the screen resolution of computing device 101, the selected font size, the selected font style, etc.

In step 502, a determination is made by computing device 101 as to whether user 102 initially interacted with a widget of the webpage. "Interacting," as used herein, refers to an involvement with the widget, which may include direct involvement, such as clicking on an element displayed within the widget, or indirect involvement, such as gazing at the widget when reading the text within the widget. As discussed above, such a determination may be made by tracking the eye gaze or focus of user 102. For example, in one embodiment, the eye tracker 105 corresponds to a web camera to track the eye gaze of user 102. In such an embodiment, the web camera detects the location of the face of user 102 followed by detecting the location of the eyes within the face of user 102 followed by detecting the orientation of the left and right eye and then mapping the orientation of the eyes onto the screen coordinate system. By mapping the orientation of the eyes onto the screen coordinate system, user interest boundary manager 402 is able to determine the focus of user 102 on display 106 of computing device 101, including a widget displayed on display 106 of computing device 101. In one embodiment, user interest boundary manager 402 obtains the locations of the widgets on the webpage displayed on display 106 of computing device 101 via the HTML code of the webpage translated by the web browser of computing device 101. User interest boundary manager 402 may then determine if user 102 is interacting with one of these displayed widgets based on the area of display 106 being focused by user 102.

If user 102 has not initially interacted with a widget of the webpage, then computing device 101 continues to determine whether user 102 is initially interacting with a widget of the webpage in step 502.

If, however, user 102 initially interacted with a widget of the webpage, then, in step 503, user interact boundary manager 402 determines the boundary of the widget of the webpage displayed on display 106 of computing device 101 utilized by user 102, such as based on the determined boundary of the webpage. For example, the boundary of the widget of interest may be based on the defined layout size of the displayed webpage. In one embodiment, the boundary of the widget of interest may be determined by user interest boundary manager 402 analyzing the HTML code of the webpage listing the border attributes of the widget of the interest.

In step 504, following the initial interaction with the widget, computing device 101 detects the user's interactions or lack of interactions with the widget within the determined boundary of the widget. As discussed above, following the initial interaction with the widget, computing device 101 detects the user's interactions or lack of interactions with the widget within the determined boundary of the widget by tracking the eye gaze or focus of user 102.

In step 505, a determination is made by computing device 101 as to whether user 102 is experiencing difficulty in using the widget based on the detected user's interactions or lack of interactions with the widget. As discussed above, such a determination is determined based on the images of the facial expressions of user 102 captured by the web camera of computing device 101 which are analyzed for eye shrinks, facial expressions and emotions, which are used to assess whether user 102 is experiencing difficulty in utilizing the widget of the webpage. For instance, if user 102 expresses anger or disgust a threshold number of times over a threshold period of time, then it may be inferred that user 102 is experiencing difficulty in utilizing the widget.

If user 102 is not experiencing difficulty in using the widget, then, in step 506, a determination is made by computing device 101 as to whether user 102 has finished using the widget. In one embodiment, such a determination is made based on whether user 102 is accessing a different webpage or is interacting with another element of the webpage. In one embodiment, a user accessing a different webpage is determined based on user 102 entering a new web address in the web browser of computing device 101. In one embodiment, a user interacting with another element of the webpage is determined based on tracking the eye gaze or focus of user 102 as discussed above. For example, the focus of the user's gaze may now be on a different widget on the webpage.

If user 102 has finished using the widget, then a determination is made by computing device 101 as to whether user 102 initially interacted with a different widget of the webpage in step 502.

If, however, user 102 has not finished using the widget, then computing device 101 continues to determine whether user 102 is experiencing difficulty in using the widget based on the detected user's interactions or lack of interactions with the widget in step 505.

Referring to step 505, if user 102 has experienced difficulty in using the widget based on the detected user's interactions or lack of interactions with the widget, then, in step 507, content extractor 403 extracts the content associated with the widget.

In step 508, mapper 404 maps the extracted content of the widget to the virtual agent content. By mapping the extracted content of the widget to the virtual agent content, the virtual agent of dialogue system 103 will now be able to provide advice, guidance and assistance to user 102 in utilizing the widget. In this manner, the virtual agent will now be able to dynamically initiate a conversation with user 102 to assist user 102 in addressing a problem user 102 is currently experiencing rather than simply initiate a conversation with a pre-selected question or statement in response to a trigger event that may or may not be relevant to addressing the user's problem with using the widget.

Additionally, in one embodiment, prior to the virtual agent initiating a conversation with user 102 based on the extracted content of the widget, layout adjuster 405 alters the layout, such as increasing the size of the font in the depicted virtual agent on display 106 to attract the attention of user 102 when the dynamic content is starting to be presented as discussed below.

In step 509, after the extracted content of the widget is mapped to the virtual agent content, AI learner 406 instructs the virtual agent of dialogue system 103 to initiate a conversation with user 102 based on the extracted content of the widget. In one embodiment, the virtual agent selects an initial question or statement to initiate the conversation based on identifying a question or statement in database 108 that is semantically relevant to the extracted content utilizing natural language processing. "Semantic relevance," as used herein, refers to assessing the semantic meaning of the extracted content of the widget and determining how relevant such a meaning is to the semantic meaning of the questions/statements stored in database 108 using natural language processing. In one embodiment, the semantic meaning of the questions/statements is based on the determined semantic meaning of the topics associated with such questions/statements. In such an embodiment, the questions/statements are categorized in database 108 based on topics.

For example, dialogue system 103 may utilize natural language processing to analyze the extracted widget content (e.g., content of weather widget) to determine the meaning of the content of the widget (e.g., weather information for the city of Austin, Tex.) and then identify an appropriate question or statement to be made to user 102 based on the determined meaning of the widget content. For instance, in one embodiment, database 108 may store a hierarchical structure of a dialog, including questions or statements involving various topics. In one embodiment, such questions/statements are classified based on such topics. Based on the determined meaning of the widget content, dialogue system 103 is able to identify the appropriate question or statement to initiate the conversation. For example, if the determined meaning of the extracted widget was weather information for the city of Austin, Tex., then dialogue system 103 may identify a question stored in database 108 related to the topic of weather forecast, such as the question of "Would you like to know how to obtain the future weather forecast," to be presented to user 102 by the virtual agent. In one embodiment, the appropriate question or statement is identified based on the topic associated with the question/statement being within a threshold degree of relevance to the determining meaning of the widget content.

After initiating the conversation with user 102 by the virtual agent, the conversation may have to be adapted if user 102 is still experiencing difficulty in utilizing the widget as discussed below in connection with FIG. 6.

FIG. 6 is a flowchart of a method 600 for adapting the conversation based on the user's utilization of the widget after initialization of the conversation by the virtual agent in accordance with an embodiment of the present invention.

Referring to FIG. 6, in conjunction with FIGS. 1-5, in step 601, computing device 101 detects the user's interactions, including lack of user's interactions, in utilizing the widget after the conversation has been initiated by the virtual agent. Such interactions may be detected by tracking the user's eye gaze or focus as discussed above.

In step 602, a determination is made by computing device 101 as to whether the user's utilization of the widget unsatisfactory. "Unsatisfactory utilization" of the widget, as used herein, refers to a lack of activity exceeding a threshold amount of time (which may be user-selected), a time of focusing on the widget by user 102 exceeding a threshold amount of time (which may be user-selected), and/or a time of focusing away from the widget by user 102 exceeding a threshold amount of time (which may be user-selected). Each of these activities (e.g., focusing on the widget, focusing away from the widget, lack of activity) is determined based on tracking the eye gaze or focus of user 102 as discussed above.

If the user's utilization of the widget is satisfactory (not unsatisfactory), then computing device 101 continues to detect the user's interactions, including lack of user's interactions, in utilizing the widget after the conversation has been initiated by the virtual agent in step 601.

If, however, the user's utilization of the widget is unsatisfactory, then, in step 603, AI learner 406 instructs the virtual agent to adapt the conversation to improve utilization of the widget. In one embodiment, the virtual agent of dialogue system 103 adapts the conversation by identifying further questions or statements to be presented to user 102 utilizing the hierarchical structure of questions and statements stored in database 108. For instance, the question of "Would you like to know how to obtain the future weather forecast?" may be preceded with another question (e.g., "Would you like to learn how to obtain weather information in the city of interest?") in the hierarchical structure that is typically first asked prior to asking this question. Consequently, the virtual agent may subsequently present the question of "Would you like to learn how to obtain weather information in the city of interest?" to user 102 if the user's utilization of the widget is unsatisfactory in response to the virtual agent presenting the question of "Would you like to know how to obtain the future weather forecast?"

In this manner, the embodiments of the present invention are able to provide the means for enabling the virtual agent to obtain the content from a widget which the user is experiencing difficulty in using which thereby allows the virtual agent to dynamically initiate a conversation with user 102 to assist user 102 in addressing a problem user 102 is currently experiencing with the widget.

Furthermore, the present invention improves the technology or technical field involving virtual agents used in dialogue systems. As discussed above, currently, virtual agents used in dialogue systems initiate a conversation with a user based on a pre-programmed set of questions or statements to ask users in response to a trigger event, such as based on user activity (e.g., user selects the option requesting help with a printer issue). That is, virtual agents initiate a conversation based on a static set of questions or statements in response to a trigger event. However, the virtual agent will not be able to provide advice, guidance and assistance to the user if there is not a trigger event. Furthermore, the lead question in the conversation begun by the virtual agent may not be helpful for the user. For example, if the user is currently experiencing difficulty in utilizing a widget of a webpage, and there is no trigger event associated with such difficulty, then the virtual agent will not be able to provide advice, guidance and assistance to the user in utilizing the widget. Furthermore, because the virtual agent uses a static set of questions or statements, the lead question may not be useful in assisting the user, such as assisting the user in utilizing the widget.

The present invention improves such technology by detecting the user's interactions or lack of interactions with a widget and extracting content associated with the widget when it is determined that the user is experiencing difficulty in utilizing the widget. The extracted content is mapped to the virtual agent content so that the virtual agent is able to dynamically initiate a conversation with the user that is directed to providing advice, guidance and assistance to address the user's difficulty in utilizing the widget. In this manner, there is an improvement in the technical field of virtual agents used in dialogue systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for initiating a conversation by a virtual agent, the method comprising:
   determining a boundary of a widget of a webpage;
   detecting user's interactions or lack of interactions with said widget within said determined boundary of said widget of said webpage;
   extracting content associated with said widget m response to a user experiencing difficulty in utilizing said widget of said webpage based on said detected user's interactions or lack of interactions with said widget;
   mapping said extracted content to a virtual agent content in order for said virtual agent to provide advice, guidance and assistance to said user in utilizing said widget of said webpage;
   altering a layout of said virtual agent depicted on a display of a computing device to attract an attention of said user prior to said virtual agent initiating a conversation;
   instructing said virtual agent to initiate said conversation based on said extracted content, wherein said virtual agent comprises a computer generated, animated, artificial intelligent virtual character with an anthropomorphic appearance;
   determining a boundary of said webpage displayed on said computing device utilized by said user;
   detecting said user interacting with said widget of said webpage; and
   determining said boundary of said widget of said webpage based on said determined boundary of said webpage, wherein said boundary of said webpage is determined based on a screen resolution of said computing device utilized by said user, a font size and a font style.

2. The method as recited in claim 1, wherein said virtual agent selects an initial question or statement to initiate said conversation based on identifying a question or statement semantically relevant to said extracted content utilizing natural language processing.

3. The method as recited in claim 1, wherein said user's interactions or lack of interactions with said widget is determined based on tracking an eye gaze or a focus of said user.

4. The method as recited in claim 1 further comprising:
   detecting user's interactions in utilizing said widget after initiating said conversation; and
   instructing said virtual agent to adapt said conversation to improve utilization of said widget in response to said detected user's interactions in utilizing said widget after initiating said conversation indicating an unsatisfactory utilization of said widget.

5. The method as recited in claim 4, wherein said unsatisfactory utilization of said widget is based on the following:
   lack of activity exceeding a first threshold amount of time,
   a time of focusing on said widget by said user exceeding a second threshold amount of time, and
   a time of focusing away from said widget by said user exceeding a third threshold amount of time.

6. A computer program product for initiating a conversation by a virtual agent, the computer program product comprising a computer readable storage medium having program code embodied therewith, the program code comprising the programming instructions for:

determining a boundary of a widget of a webpage;
detecting user's interactions or lack of interactions with said widget within said determined boundary of said widget of said webpage;
extracting content associated with said widget m response to a user experiencing difficulty in utilizing said widget of said webpage based on said detected user's interactions or lack of interactions with said widget;
mapping said extracted content to a virtual agent content in order for said virtual agent to provide advice, guidance and assistance to said user in utilizing said widget of said webpage;
altering a layout of said virtual agent depicted on a display of a computing device to attract an attention of said user prior to said virtual agent initiating a conversation;
instructing said virtual agent to initiate said conversation based on said extracted content, wherein said virtual agent comprises a computer generated, animated, artificial intelligent virtual character with an anthropomorphic appearance;
determining a boundary of said webpage displayed on said computing device utilized by said user;
detecting said user interacting with said widget of said webpage; and
determining said boundary of said widget of said webpage based on said determined boundary of said webpage,
wherein said boundary of said webpage is determined based on a screen resolution of said computing device utilized by said user, a font size and a font style.

7. The computer program product as recited in claim 6, wherein said virtual agent selects an initial question or statement to initiate said conversation based on identifying a question or statement semantically relevant to said extracted content utilizing natural language processing.

8. The computer program product as recited in claim 6, wherein said user's interactions or lack of interactions with said widget is determined based on tracking an eye gaze or a focus of said user.

9. The computer program product as recited in claim 6, wherein the program code further comprises the programming instructions for:
detecting user's interactions in utilizing said widget after initiating said conversation; and
instructing said virtual agent to adapt said conversation to improve utilization of said widget in response to said detected user's interactions in utilizing said widget after initiating said conversation indicating an unsatisfactory utilization of said widget.

10. The computer program product as recited in claim 9, wherein said unsatisfactory utilization of said widget is based on the following:
lack of activity exceeding a first threshold amount of time,
a time of focusing on said widget by said user exceeding a second threshold amount of time, and
a time of focusing away from said widget by said user exceeding a third threshold amount of time.

11. A system, comprising:
a memory for storing a computer program for initiating a conversation by a virtual agent; and
a processor connected to said memory, wherein said processor is configured to execute the program instructions of the computer program comprising:
determining a boundary of a widget of a webpage;
detecting user's interactions or lack of interactions with said widget within said determined boundary of said widget of said webpage;
extracting content associated with said widget in response to a user experiencing difficulty in utilizing said widget of said webpage based on said detected user's interactions or lack of interactions with said widget;
mapping said extracted content to a virtual agent content in order for said virtual agent to provide advice, guidance and assistance to said user in utilizing said widget of said webpage;
altering a layout of said virtual agent depicted on a display of a computing device to attract an attention of said user prior to said virtual agent initiating a conversation;
instructing said virtual agent to initiate said conversation based on said extracted content, wherein said virtual agent comprises a computer generated, animated, artificial intelligent virtual character with an anthropomorphic appearance;
determining a boundary of said webpage displayed on said computing device utilized by said user;
detecting said user interacting with said widget of said webpage; and
determining said boundary of said widget of said webpage based on said determined boundary of said webpage,
wherein said boundary of said webpage is determined based on a screen resolution of said computing device utilized by said user, a font size and a font style.

12. The system as recited in claim 11, wherein said virtual agent selects an initial question or statement to initiate said conversation based on identifying a question or statement semantically relevant to said extracted content utilizing natural language processing.

13. The system as recited in claim 11, wherein said user's interactions or lack of interactions with said widget is determined based on tracking an eye gaze or a focus of said user.

14. The system as recited in claim 11, wherein the program instructions of the computer program further comprise:
detecting user's interactions in utilizing said widget after initiating said conversation; and
instructing said virtual agent to adapt said conversation to improve utilization of said widget in response to said detected user's interactions in utilizing said widget after initiating said conversation indicating an unsatisfactory utilization of said widget.

\* \* \* \* \*